United States Patent [19]

Groff et al.

[11] 4,080,008
[45] Mar. 21, 1978

[54] BIASED ACTUATING WHEELS

[75] Inventors: Eugene R. Groff, Chillicothe, Ill.; John W. Sogge, Cedar Rapids, Iowa; Albert L. Woody, Peoria, Ill.

[73] Assignee: Caterpillar Tractor Co., Peoria, Ill.

[21] Appl. No.: 712,568

[22] Filed: Aug. 9, 1976

[51] Int. Cl.² ............................................. B62D 55/12
[52] U.S. Cl. ....................................... 305/57; 74/229; 74/243 R; 267/182
[58] Field of Search ................... 305/21, 24, 28, 5, 57, 305/56; 301/51; 267/182; 74/443, 229, 243 R

[56] References Cited

U.S. PATENT DOCUMENTS

| | | | |
|---|---|---|---|
| 1,012,331 | 12/1911 | Cunningham | 152/22 |
| 1,046,969 | 12/1912 | Chaloner | 301/51 X |
| 1,287,255 | 12/1918 | DeCarmona | 152/21 X |
| 1,715,145 | 5/1929 | Pirrone | 301/51 X |
| 3,889,550 | 6/1975 | Boggs et al. | 74/443 |

Primary Examiner—Robert B. Reeves
Assistant Examiner—John P. Shannon
Attorney, Agent, or Firm—Frank L. Hart

[57] ABSTRACT

Drive or driven wheels of a track-type vehicle have a hub and a plurality of teeth around the outer periphery each of which are spaced one from the other by an intervening root having an opening. A biasing hoop assembly having a multiplicity of generally concentric biasing hoops encompass the hub and are positioned between the hub and teeth. Actuating apparatus extends from the root into contact with the biasing hoop assembly and is generaly movable for deflecting the biasing hoops and resisting entry into the root for dampening impact, loads, and noise of elements entering the root.

13 Claims, 11 Drawing Figures

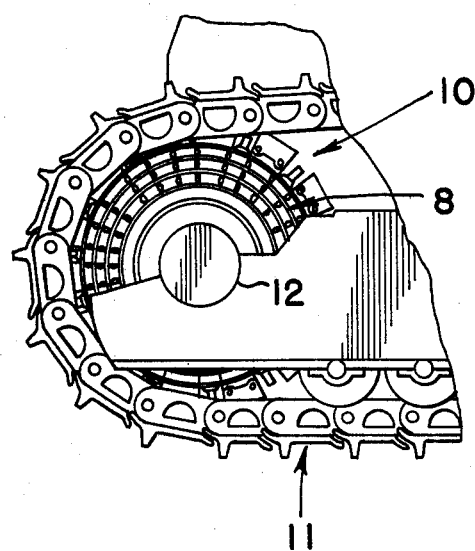
Fig_1_
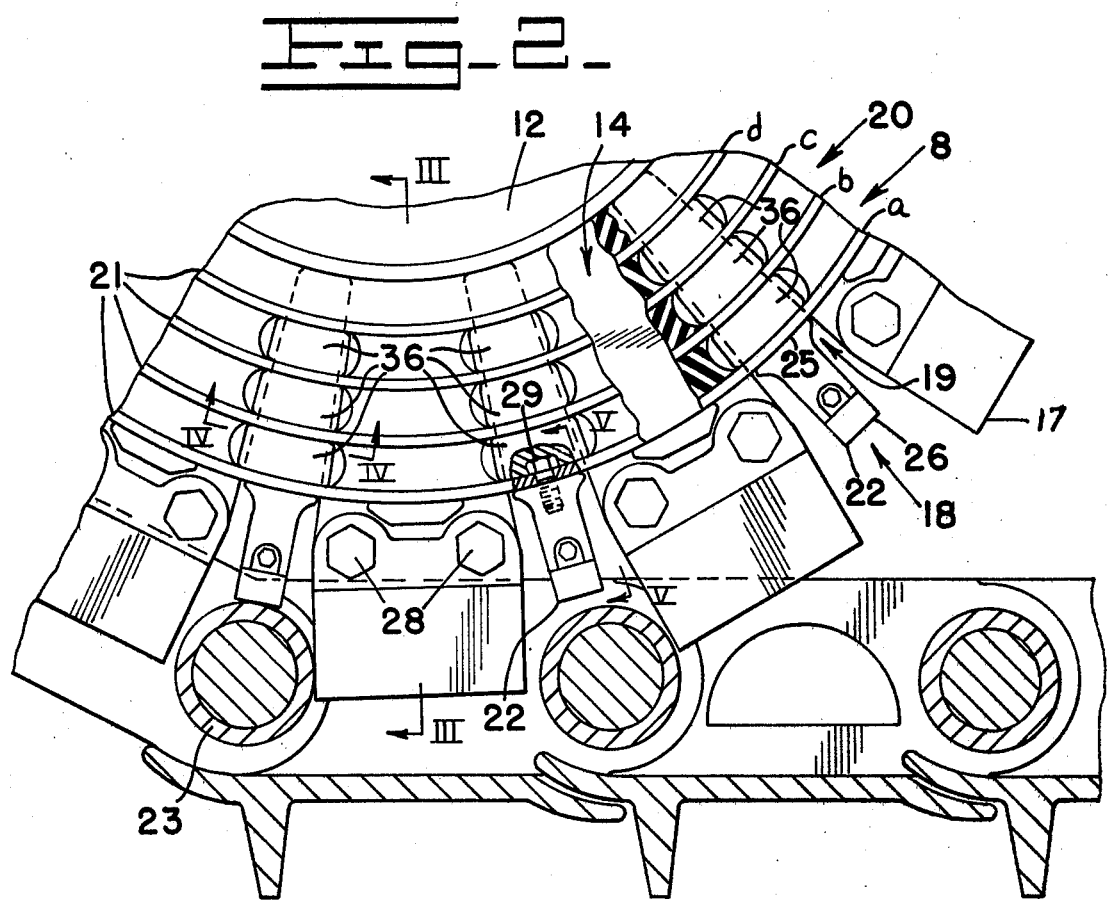
Fig_2_

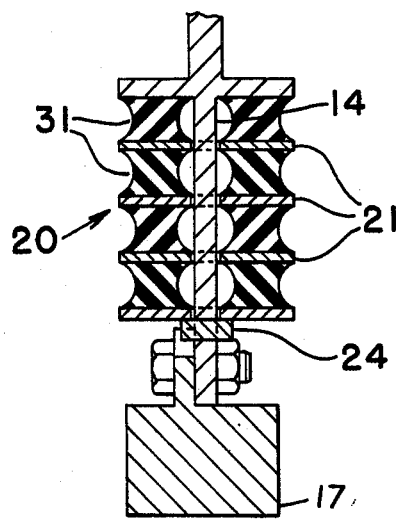
Fig_3_
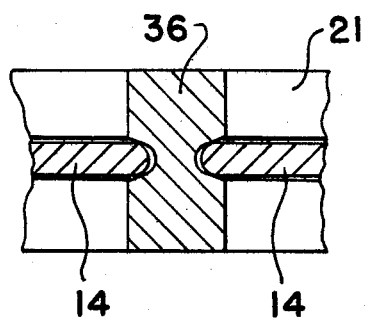
Fig_4_
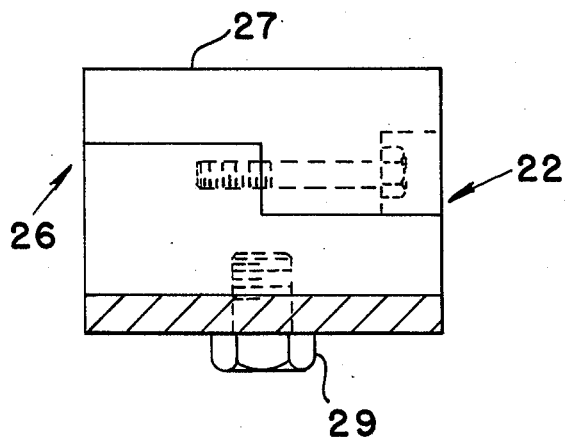
Fig_5_
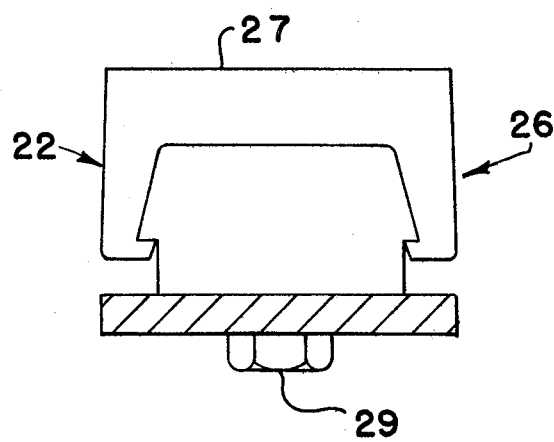
Fig_6_

BIASED ACTUATING WHEELS

BACKGROUND OF THE INVENTION

In the operation of machinery, drive and/or driven wheels of the machinery are often subjected to severe impact from other elements which are used to drive or be driven by said wheels. These repeated severe impacts sometimes generate damaging forces, undesirable wear rate, and noise which result in waste of materials.

This invention therefore resides in actuating wheels which function to dampen these impacts and reduce the noise of operation.

BRIEF DESCRIPTION OF THE DRAWINGS

FIG. 1 is a diagrammatic side view of a portion of a track-type vehicle having an actuating wheel of this invention;

FIG. 2 is an enlarged diagrammatic side view in partial section of a portion of the wheel of FIG. 1;

FIG. 3 is a diagrammatic view taken along lines III—III of FIG. 2 of a portion of the wheel;

FIG. 4 is a diagrammatic view taken along lines IV—IV of FIG. 2 of a portion of the wheel;

FIG. 5 is a diagrammatic view of one embodiment of a tooth of a sprocket wheel;

FIG. 6 is a diagrammatic view of another embodiment of a tooth of a sprocket wheel;

DETAILED DESCRIPTION OF THE INVENTION

Figure 7:
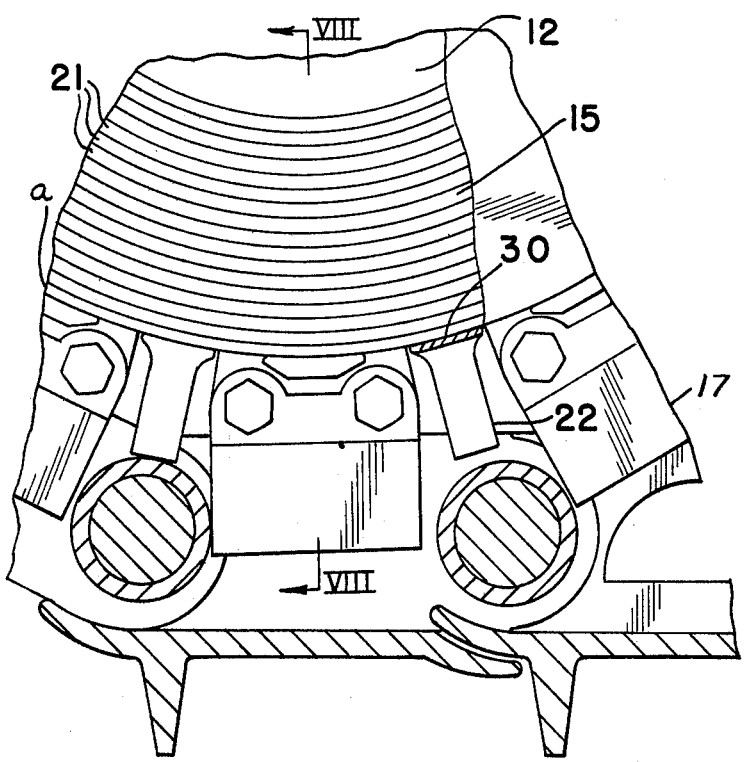
FIG. 7 is a diagrammatic side view in partial section of a portion of another embodiment of the wheel of this invention.

Referring to FIG. 1, the wheel 10, for example a sprocket wheel for driving continuous track 11 of a crawler-type vehicle 9, has a hub 12 substantially concentrically connected to a plurality of teeth 17. The teeth 17 are spaced a preselected distance from the hub 12 thereby forming an annulus 8 between the hub 12 and or outer elements teeth 17.

Figure 8:
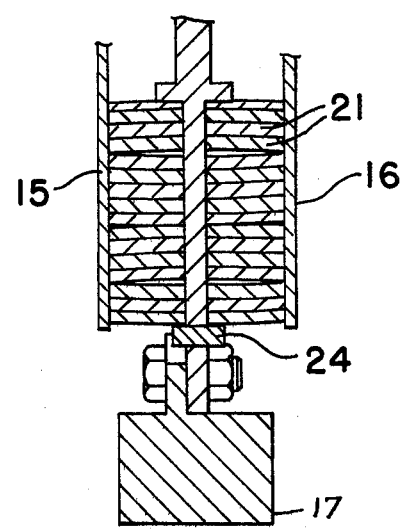
FIG. 8 is a diagrammatic sectional view taken along lines VIII—VIII of FIG. 7.
Figure 9:
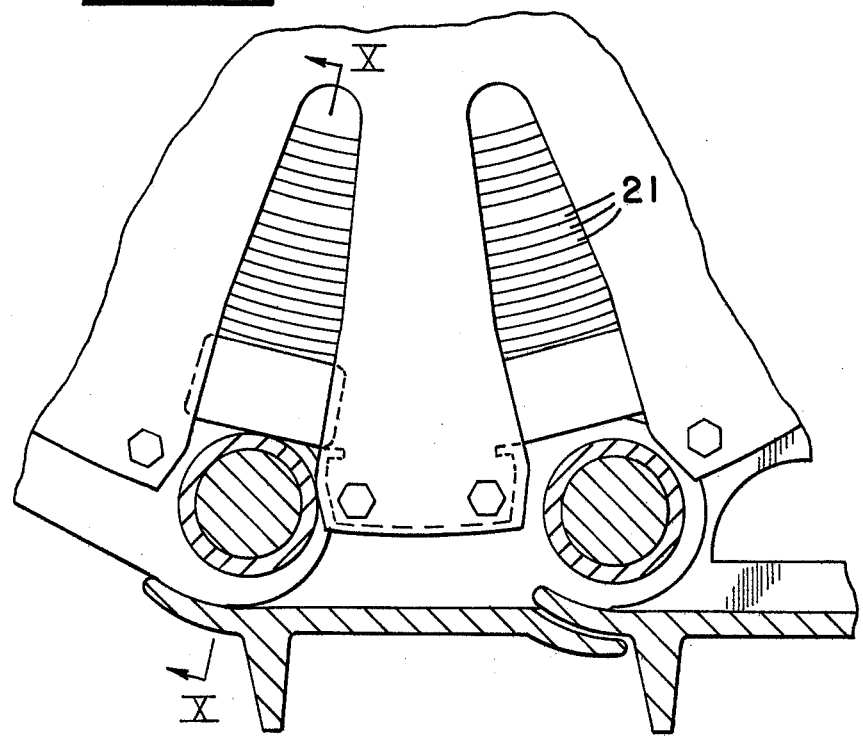
FIG. 9 is a diagrammatic side view in partial section of a portion of another embodiment of the wheel of this invention.

The hub 12 can be connected to the teeth 17 by spokes 14, as shown in FIGS. 2, 3, and 9, by first and second sidewall panels 15,16, as shown in FIGS. 7 and 8, or both.

The wheel 10 has a plurality of drive teeth 17 around the outer periphery. Each tooth is spaced along the outer periphery one from the other by an intervening root area or space 18, as this cavity is known in the art. An opening 19 extends preferably radially through the teeth 17 from the base of the root 18.

A biasing hoop assembly 20 is positioned in the annulus 8 defined by and positioned between the teeth 17 and hub 12. The biasing hoop assembly 20 is formed of a multiplicity of nested biasing hoops generally referred to by numeral 21 and further identified by letters "a-d" in decreasing diametrical order (FIG. 2). The biasing hoops 21 are generally concentrically oriented in the annulus and are formed of a resilient material such as steel, for example.

An actuating means 22, such as a piston, extends from the root 18, through the root opening 19, and into contact with the biasing hoop assembly 20. The actuating means 22 is generally radially movable for deflecting the biasing hoops 21 and resisting entry of elements, for example a bushing of a track joint 23, into the root 18. Actuating means 22 are preferably associated with each root 18 of the actuating wheel 10.

The actuating means 22 has an inner end 25 for contacting and biasing the biasing hoop assembly in response to a load placed thereon an outer end 26 extending a preselected distance outwardly from the base of the root 18. That distance can be, for example, about one-third of the length of the associated tooth.

Referring to FIGS. 5 and 6, the outer end 26 of the actuating means 22 can have a removable contacting element 27 that is replaceable after sufficiently worn by operation of the wheel 10. The teeth of the drive wheel are also preferably removably connected by bolts 28 or other means so they can likewise be replaced after wear (FIG. 2).

Referring to FIG. 3, tension means 24, such as a spacer block, can be connected to the hub 12, the teeth 17, or both for contacting the biasing hoop assembly 20 and controllably imparting loading forces onto the assembly 20. These tension means 24 can also be threadably connected to a spoke 14 or connected by a bolt to the teeth or hub for controllably altering preloading of the biasing hoop assembly 20.

Referring to FIGS. 2, 5, and 6, the actuating means 22 can be directly connected to the outermost biasing hoop (a) of the biasing hoop assembly 20 by a bolt 29, for example, or be free from connection as shown in FIG. 7. However, it is preferred that a contacting element 30 be positioned between the biasing hoop (a) and the actuating means 22 in order to prevent an excessive wear rate where the actuating means 22 is not connected to biasing hoop (a). Contacting element 30 can be a replaceable element formed of rubber for example.

Figure 10:
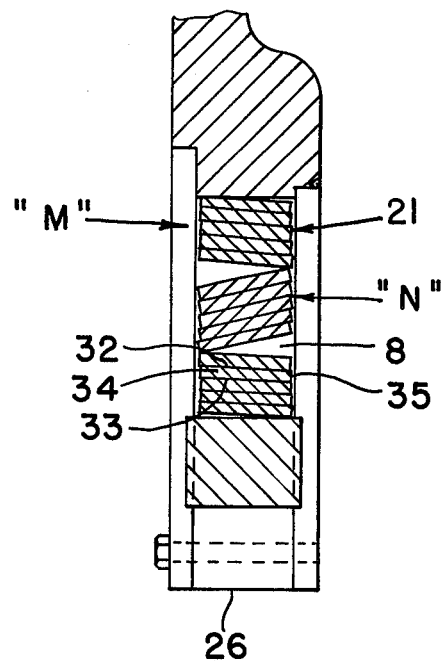
FIG. 10 is a diagrammatic sectional view taken along lines X—X of FIG. 9.
Figure 11:
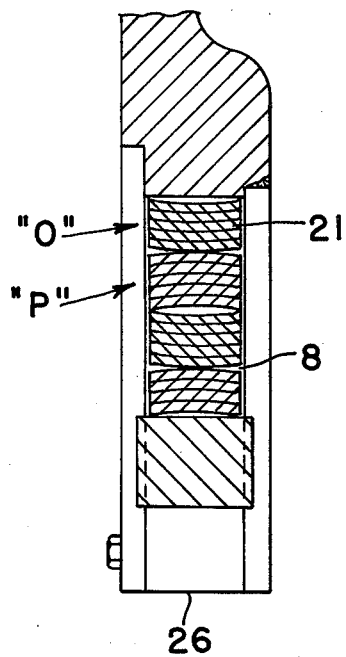
FIG. 11 is a diagrammatic sectional view taken along lines X—X of FIG. 9 showing springs of another embodiment.

The biasing hoop assembly 20 can be of various construction without departing from this invention. The biasing hoops 21 can be of common cross-sectional configuration as the hoops 21 of FIG. 3, of different cross-sectional configuration, and can be oriented differently as shown in FIGS. 10 and 11. The specific cross-sectional configuration and orientation of the biasing hoops 21 can be easily determined after the use of the wheel 10 has been determined and the magnitude of impact has been calculated. As is known in the art, the various cross-sectional configurations and orientations will vary the magnitude of resistance imparted by the actuating means 22.

FIG. 3 shows biasing hoops 21 being of generally common cross-sectinal configuration having spacing means 31 of different material, for example rubber rings, positioned between adjacent biasing hoops 21; FIG. 10 shows biasing hoops 21 having inner and outer surfaces 32,33 and first and second edges 34,35 with the planes of the surfaces 32,33 of one group of hoops "M" angularly disposed relative to the planes of the surfaces 32,33 of another group of hoops "N". FIG. 11 shows biasing hoops 21 having an arcuate cross-sectional configuration with one group of hoops "O" oriented differently than another group of hoops "P".

FIG. 4 shows an example connection of the hoop assembly 20 wherein the hoops 21 have an opening extending therethrough for receiving a spoke 14. Spacers 36 can be positioned between the spokes on opposed sides of the hoop 21 for adding strength and stability to the construction.

In the operation of the apparatus of this invention, the actuating means 22 are fully extended and the biasing hoops 21 are generally concentrically positioned about the hub 12 in the absence of load placed on any of the actuating means 22. Entry of the bushing of the track pin 23 or other elements into the root 18 places a load on the actuating means 22 which causes the actuating means 22 to move toward the hub 12 and deflect the biasing hoops 21, which in turn cause reaction forces to be subject through the actuating means 22 and against the track pin 23. These reaction forces which are responsive to deflection of the biasing hoops 21 thereby reduce the force of impact of the track pin 23 on the outer end 26 of the actuating means 22 and the biasing hoop assembly 20. After removal of the forces on a particular actuating means 22, it is returned to the original position in response to forces of the deflected biasing hoops 21.

Other aspects, objects, and advantages of this invention can be obtained from a study of the drawings, the disclosure, and the appended claims.

What is claimed is:

1. A wheel of a track-type vehicle, comprising:
   a hub;
   a plurality of teeth connected to said hub and concentrically spaced about the hub and spaced one from the other by an intervening root area having an opening;
   a biasing hoop assembly having a multiplicity of nested, generally concentric biasing hoops having different diameters and encompassing the hub and being positioned between the hub and the plurality of teeth; and
   actuating means extending from the root area, through the root opening, and into contact with the biasing hoop assembly and being generally radially movable for deflecting the biasing hoops and resisting entry into the root area.

2. Apparatus, as set forth in claim 1, including:
   means in contact with the biasing hoop assembly and being associated with one of the teeth or hub for biasing the biasing hoop assembly for controllably imparting loading forces onto said assembly.

3. Apparatus, as set forth in claim 1, wherein the actuating means comprises a piston having an inner end for contacting the biasing hoop assembly and an outer end extending a preselected distance outwardly from a bore of the root area.

4. Apparatus, as set forth in claim 1, wherein the wheel has first and second spaced sidewalls connecting the hub to the rim.

5. Apparatus, as set forth in claim 1, wherein the wheel has a plurality of spokes, each being connected at one end to the hub, extending through openings of the biasing hoops of the biasing assembly, and being connected at the other end to one of the teeth.

6. Apparatus, as set forth in claim 1, wherein a first portion of the plurality of biasing hoops of the hoop assembly is of a different configuration than a second portion of the biasing hoops.

7. Apparatus, as set forth in claim 1, including:
   spacing means positioned between a portion of the plurality of biasing hoops of the biasing assembly.

8. Apparatus, as set forth in claim 1, wherein at least a portion of the biasing hoops of the biasing assembly each have inner and outer surfaces and first and second edges, and a first portion of the plurality of biasing hoops is oriented with the planes of their inner and outer surfaces angularly disposed relative to the planes of the inner and outer surfaces of another portion of the biasing hoops.

9. Apparatus, as set forth in claim 1, wherein at least a portion of the plurality of biasing hoops of the biasing assembly each have inner and outer surfaces and first and second edges and said inner and outer surfaces are of an arcuate cross-sectional configuration.

10. Apparatus, as set forth in claim 9, wherein the concave surface of a portion of the plurality of biasing hoops is oriented toward the hub and the concave surface of another portion of the biasing hoops is oriented toward the teeth.

11. Apparatus, as set forth in claim 1, wherein the biasing hoop assembly includes a removable contacting element positioned between the actuating means and the biasing hoop which has the largest diameter.

12. Apparatus, as set forth in claim 1, wherein the actuating means includes a removable contacting element extending over the outer end portion of said means.

13. Apparatus, as set forth in claim 1, including:
   means for connecting the actuating means to the biasing hoop of the biasing hoop assembly which has the largest diameter.

* * * * *